(No Model.)
J. T. APPLEBERG.
APPARATUS FOR PRESERVING MILK.
No. 413,472. Patented Oct. 22, 1889.
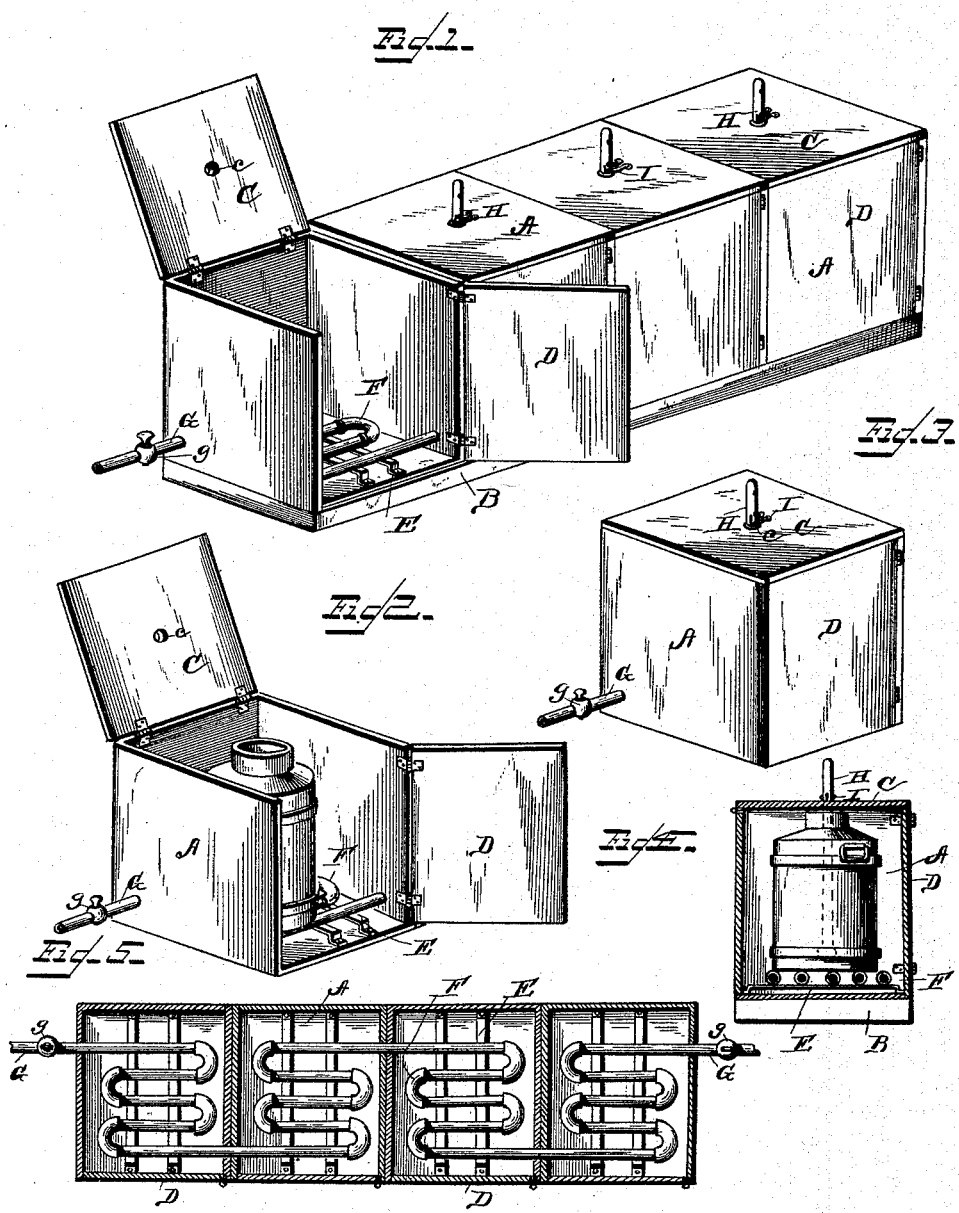
WITNESSES
INVENTOR

UNITED STATES PATENT OFFICE.

JOHN T. APPLEBERG, OF KNOXVILLE, TENNESSEE.

APPARATUS FOR PRESERVING MILK.

SPECIFICATION forming part of Letters Patent No. 413,472, dated October 22, 1889.

Application filed February 15, 1889. Serial No. 299,974. (No model.)

*To all whom it may concern:*

Be it known that I, JOHN T. APPLEBERG, a citizen of the United States, and a resident of Knoxville, in the county of Knox and State of Tennessee, have invented certain new and useful Improvements in Apparatus for Preserving Milk; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my apparatus for preserving milk. Fig. 2 is a similar view of one of the boxes or compartments of the apparatus, showing the same open. Fig. 3 is a similar view of the same, showing it closed. Fig. 4 is a vertical sectional view of one of the compartments or heating-boxes, and Fig. 5 is a horizontal sectional view of the same on line $x\,x$ in Fig. 4.

Like letters of reference denote corresponding parts in all the figures.

My invention relates to apparatus for preserving milk by subjecting the same to a sufficiently high temperature to effectually destroy bacteria and other germs which it may contain while in a fresh condition; and it consists in the construction and combination of parts of the apparatus hereinafter more fully described and claimed, which is adapted to treat the milk while the same is contained in the ordinary milk-cans, wherein it is usually shipped from the dairies or "milk-farms," and afterward offered for sale from milk-wagons or in the stores of cities.

My apparatus consists of a series of boxes A, arranged in a "battery" alongside one another, as illustrated in Fig. 1, the number of boxes in a battery depending upon the capacity of the concern using the invention.

In Fig. 1 of the drawings I have thus, for example, shown a battery consisting of four boxes, one of which is shown open and the others closed. These boxes are placed upon a platform B, of suitable height, and are each provided with a hinged top cover C and hinged front door D, by opening one or both of which access may readily be had to the inside of the box. Near the closed bottom of each box is placed a grating or support E, upon which rests a flat coil F of pipe; or, instead of a coil, parallel sections of pipe may be used, coupled together endwise by U-shaped end pieces or couplings, as shown in the drawings. This inside pipe is connected by suitable steam-tight joints or couplings to connecting-pipes G, which are provided with suitable valves $g$, for controlling the flow of steam or shutting it off altogether. The steam is supplied from a boiler or steam-generator (not shown in the drawings) of any approved construction. The hinged cover C has a central aperture $c$, for the insertion of a thermometer or indicator H, which is held in place adjustably and removably by means of a spring clip or clasp I, or other suitable device adapted for the purpose. For the sake of convenience, this thermometer or indicator has only two marks on its face, the lowermost one of which indicates the minimum and the uppermost the maximum degree of heat to which the milk is to be subjected during treatment. This enables the attendant in charge to observe, at a single glance and without close inspection, whether the proper temperature is maintained in each box.

The operation of this apparatus is as follows: The fresh milk, after straining, is poured into cans of the usual construction, one of which is shown in Fig. 2. The cover of the can having been removed, it is placed in its appropriate box by opening the top and door of the same, with its bottom resting upon the coil or sections of steam-pipe F. The box is then closed (both the cover and door fitting airtight) and the indicator is inserted through the top aperture $c$, with the bulb at its lower end projecting down into the milk, after which the aperture $c$ is packed around the stem of the indicator. All or part of the boxes having been filled in this manner, properly closed, and their respective indicators adjusted, steam is turned on until the lower mark on the indicators registers 160° Fahrenheit. The steam is admitted in the first instance very rapidly, so as to reach the point of 160° Fahrenheit as soon as possible, thus avoiding the liability of separation taking place. The heat in the boxes is then regulated and modified until the upper mark on the indicators is reached and a temperature of 185° Fahrenheit is registered, with the result that the germs contained in the milk will be effectually destroyed without changing the character of the fluid, as the heat is never raised to the boiling-point, (212° Fahrenheit.) In other words, when the steam is first admitted, it is desirable that a very rapid inflow be provided, so that the indicator may register 160° Fahrenheit as soon as possible, thereby guarding against separation, which would be apt to take place were a slow heat permitted, also at the same time economizing time. Between 160° and 185°, however, the necessity for a rapid heat no longer exists, as there is not the same likelihood of separation occurring, and consequently the heat is then regulated so as to slowly or gradually reach the maximum point of 185° Fahrenheit, thereby preventing the too rapid rise up to the higher mark. After the cans, with their contents, have been subjected to this treatment for a sufficient length of time, steam is turned off, the boxes opened, and the cans withdrawn and closed, after which they are ready (when cooled off sufficiently) for shipment and sale.

It is obvious that instead of arranging the series of boxes in a horizontal row, as in the drawings, they may be arranged in a vertical column or tier one above another where it is desired to economize space. It is more convenient, however, to handle the cans where the boxes are arranged in a row and upon a platform of suitable height, as illustrated on the drawings.

Having thus described my invention, I claim and desire to secure by Letters Patent of the United States—

The herein-described apparatus for preserving milk by heating, the same consisting of a series of boxes, each adapted to contain a milk-can, having hinged tightly-fitting doors and covers and provided near the bottom with a horizontal coil of pipe adapted to support the can, and having a packed aperture in the hinged cover for the insertion of a thermometer or indicator, the several coils or supports of pipe (one for each box) communicating with one another to permit a flow of steam through the entire series, substantially as and for the purpose shown and set forth.

In testimony that I claim the foregoing as my own I have hereunto affixed my signature in presence of two witnesses.

JOHN T. APPLEBERG.

Witnesses:
H. N. CUMP,
JOS. K. MITCHELL.